March 18, 1952  J. M. LURIE  2,589,502
LAMINATED SHEET FOR USE AS A WALL OR FLOOR COVERING
Filed April 14, 1947
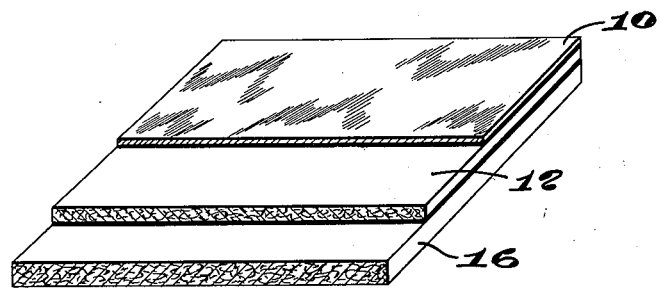
Inventor:
Joseph M. Lurie
by J. Stanley Churchill
his Atty.

Patented Mar. 18, 1952

2,589,502

UNITED STATES PATENT OFFICE 2,589,502

LAMINATED SHEET FOR USE AS A WALL OR FLOOR COVERING

Joseph M. Lurie, Lewiston, Maine, assignor to Bonafide Mills, Inc., Lisbon, Maine, a corporation of Maine Application April 14, 1947, Serial No. 741,237

4 Claims. (Cl. 154—49)

This invention relates to a laminated sheet particularly adapted for use as a wall or floor covering.

In general, the object of the invention is to produce a novel laminated sheet having characteristics which render it particularly suitable for use with advantage as a wall or floor covering, which may be economically manufactured, and when used as a floor covering has the ability of lying flat and of resisting undesired lamination during use, and in addition which possesses a certain degree of resiliency while presenting a surface capable of withstanding the weight of furniture resting thereon without becoming distorted or indented thereby.

With this general object in view, and such others as may hereinafter appear, the invention consists in the laminated sheet and in the method of making the same, hereinafter described and particularly defined in the claims at the end of this specification.

The drawing shows the present laminated sheet in perspective.

In general, the present laminated sheet embodies a relatively thin film comprising an elastomer such a vinyl resin, or other synthetic resin, or any of the rubbers either natural or synthetic. This film is preferably formed as a preformed sheet which is cemented or otherwise bonded to a thin but substantially incompressible non-laminable supporting sheet such as a sheet of hard fiber board, a sheet of vulcanized fiber, a thin metal sheet, or a glass-fiber sheet. The composite sheet thus formed is then preferably adhesively bonded to a thicker cushioning layer which may comprise any of the commercially obtainable felt boards, roofing felts, certain resilient fiber boards, or other material possessing substantial body and some resiliency. The laminated sheet thus produced may be economically manufactured and forms a floor or wall covering having substantial utility, particularly in that the relatively hard incompressible supporting sheet for the thin plastic film serves to prevent indenting or distortion of the sheet under the weight of the office or household furniture. In use the non-laminable feature of the dense supporting sheet reduces to a minimum liability of the surface film becoming detached when the sheet is subjected to wear during use.

Referring to the drawing, which illustrates the preferred embodiment of the invention, 10 represents a preformed sheet of an elastomer such as a synthetic resin, a rubber either natural or synthetic, and which may and preferably will comprise a preformed sheet of vinyl resin. 12 represents a thin supporting sheet to which the elastomer 10 is bonded by a layer of vinyl resin or other suitable cement capable of bonding the vinyl resin sheet 10 to the underlying supporting sheet 12. The supporting sheet may and preferably will comprise a relatively thin sheet of hard fiber board, of vulcanized fiber, of metal, or of a glass-fiber sheet, and for the purposes of the present invention it is desirable that such a supporting sheet should possess firmness, limited flexibility and relatively high density, and that it should not delaminate thereby to prevent scarring and scuffing of the floor or wall covering during use. It is furthermore desirable that the sheet be water-resistance so as to minimize distortion under varying conditions of humidity. While the laminated sheet as thus far described may be useful for various wall and floor covering purposes, nevertheless, it is preferred to bond a cushioning sheet 16 to the underlying surface of the supporting sheet, and for this purpose various resilient fiber boards, felt sheets such as roofing felts, or equivalent materials may be utilized as the cushioning layer 16 and these will be cemented to the under surface of the supporting sheet 12 by a suitable cement such as an asphaltic cement.

The method of manufacturing a laminated sheet embodying the invention will be understood from the following description of the production of a floor covering embodying the invention and comprising a thin sheet of vinyl resin, combined with an underlying supporting sheet of hard fiber and backed by asphalt saturated felt to impart thickness and cushion to a laminated structure. A hard fiber board of .020 to .030 inch in thickness is first coated with a cement having vinyl resin as a base and which may be obtained upon the open market. A sheet of vinyl resin of from .008 to .012 inch in thickness is placed over the cement coated board, both sheets being cut to the size of the press which is to be used in laminating the structure. In practice it is preferred to build up an assembly of a plurality of the cemented vinyl resin-fiber board laminae with chromium steel plates used to separate adjacent laminae of the assembly. After the assembly has been built up the press is closed and a pressure of approximately 400 lbs. per square inch is applied and the temperature raised to approximately 300° F. and held for a period of at least ten minutes. Cold water is then turned on to cool the press and the temperature is dropped to the neighborhood of 90°

F. before opening the press. This operation effects a firm bond of the vinyl resin sheets 10 to their fiber board supporting sheets 12, and the product may be used for various floor covering purposes, but it is preferred to bond a cushioning felt 16 to the under side of the fiber board supporting sheet 12, and I have experienced satisfactory results by placing the vinyl resin-fiber board product in a cold press with a sheet of asphalt saturated felt underlying the uncoated surface of the fiber board utilizing an asphaltic cement between the board and the felt. The assembly is then pressed at relatively high pressure, as for example 800 lbs. per square inch, for a period of at least two minutes. Thereafter the press is opened and the final sheet may be cut into the form of tiles or to any other desired size, and forming an efficient commercial floor or wall covering characterized by a dense surface which may be colored by utilizing a properly pigmented vinyl resin sheet.

In producing the vinyl resin sheet, I have experienced satisfactory results utilizing copolymers of vinyl acetate and vinyl chloride, and incorporating a suitable plasticizer, and a lubricant such as a calcium soap, together with a stabilizer, such as a lead compound, and any usual pigment to obtain the desired color and opacity. The relative proportions of the components may be varied depending on the characteristics desired. As used throughout the claims, the term "resinous" sheet is intended to define and include any suitable synthetic resin and any of the rubbers both synthetic and natural.

Having thus described the invention, what is claimed is:

1. A laminated sheet for use as a covering for floors, walls, and other surfaces, comprising a thin preformed thermoplastic resinous sheet bonded to one surface of a thin preformed substantially incompressible non-resinous supporting sheet capable of withstanding without appreciable deformation the weight of a person walking thereon, and a fibrous cushioning sheet of substantial thickness bonded to the second surface of the said supporting sheet to impart resiliency to the laminated structure, said substantially incompressible supporting sheet assisting in maintaining the resinous sheet in a substantially plane condition during use.

2. A laminated sheet for use as a covering for floors, walls, and other surfaces, comprising a thin preformed thermoplastic resinous sheet comprising a copolymer of vinyl acetate and vinyl chloride bonded to one surface of a thin preformed substantially incompressible non-resinous supporting sheet capable of withstanding without appreciable deformation the weight of a person walking thereon, and a fibrous cushioning sheet bonded to the second surface of the said supporting sheet to impart resiliency to the laminated structure, said substantially incompressible supporting sheet assisting in maintaining the resinous sheet in a substantially plane condition during use.

3. A laminated sheet for use as a covering for floors, walls, and other surfaces, comprising a thin preformed thermoplastic resinous sheet bonded to one surface of a relatively thin hard preformed single-ply and substantially incompressible fiber board supporting sheet capable of withstanding without appreciable deformation the weight of a person walking thereon, and a fibrous cushioning sheet bonded to the second surface of the said supporting sheet to impart resiliency to the laminated structure, said substantially incompressible supporting sheet assisting in maintaining the resinous sheet in a substantially plane condition during use.

4. A laminated sheet for use as a covering for floors, walls and other surfaces comprising a preformed thermoplastic resinous sheet of a thickness of from .008 to .012 inches, comprising a copolymer of vinyl acetate and vinyl chloride bonded to one surface of a hard fibrous substantially incompressible fiber board of a thickness of from .020 to .030 inches and a resilient fibrous layer bonded to the undersurface of said fiber board and of a thickness substantially greater than the thickness thereof, said hard fiber board assisting in maintaining the resinous sheet in a substantially plane condition when walked on during its use as a floor covering.

JOSEPH M. LURIE.

REFERENCES CITED

The following references are of record in the file of this patent:

UNITED STATES PATENTS

| Number | Name | Date |
|---|---|---|
| 1,994,697 | Eichengrum | Mar. 19, 1935 |
| 2,035,884 | Harvey | Mar. 31, 1936 |
| 2,055,032 | Johnson | Sept. 22, 1936 |
| 2,123,155 | Groff | July 5, 1938 |
| 2,145,068 | Batcheller | Jan. 24, 1939 |
| 2,149,732 | Groff | Mar. 7, 1939 |
| 2,185,356 | Robertson | Jan. 2, 1940 |
| 2,232,762 | Batcheller | Feb. 25, 1941 |
| 2,234,621 | Brous | Mar. 11, 1941 |
| 2,336,235 | Fischer | Dec. 7, 1943 |
| 2,430,934 | Kemmler et al. | Nov. 18, 1947 |

FOREIGN PATENTS

| Number | Country | Date |
|---|---|---|
| 18,714 | Great Britain | 1903 |